US011381985B2

(12) United States Patent
Sevindik et al.

(10) Patent No.: US 11,381,985 B2
(45) Date of Patent: *Jul. 5, 2022

(54) WIRELESS COMMUNICATION LINK MANAGEMENT

(71) Applicant: Charter Communications Operating, LLC, St. Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/719,017

(22) Filed: Dec. 18, 2019

(65) Prior Publication Data

US 2021/0195446 A1    Jun. 24, 2021

(51) Int. Cl.
*H04W 24/08* (2009.01)
*H04W 72/08* (2009.01)
*H04W 76/10* (2018.01)

(52) U.S. Cl.
CPC ........... *H04W 24/08* (2013.01); *H04W 72/08* (2013.01); *H04W 76/10* (2018.02)

(58) Field of Classification Search
CPC ...................................................... H04L 12/50
USPC ........................................................ 370/412
See application file for complete search history.

(56) References Cited

U.S. PATENT DOCUMENTS 10,966,264 B2 *   3/2021   Sevindik ............... H04W 76/15
2019/0296810 A1 *  9/2019   Forenza ............... H04B 7/0434

* cited by examiner

*Primary Examiner* — Dang T Ton
(74) *Attorney, Agent, or Firm* — Armis IP Law, LLC

(57) ABSTRACT

A wireless network environment includes a wireless station, a wireless access point, and communication management resource. The communication management resource establishes first wireless connectivity between the first wireless station and the second wireless station. The second wireless station is in communication with the wireless access point, which provides second wireless connectivity to multiple communication devices in a wireless network environment. The communication management resource measures link quality provided by the first wireless connectivity. Depending on the measured link quality provided by the first wireless connectivity, the communication management resource controls conveyance of communications over the second wireless connectivity.

26 Claims, 10 Drawing Sheets

WIRELESS COMMUNICATION LINK MANAGEMENT

BACKGROUND

Conventional wireless networks typically include one or more wireless stations to provide mobile communication devices access to a remote network such as the Internet. One type of wireless station is a so-called CBSD (Citizen Broadband Radio Service Device).

In an example CBRS (Citizens Band Radio Service) network, each CBSD (Citizen Broadband Radio Service Device) is assigned one or more wireless channels from an entity such as a Spectrum Access Service (SAS).

Certain conventional implementations of wireless base stations include providing wireless network connectivity to a customer via a so-called fixed wireless access link. In such an instance, a wireless base station establishes a respective fixed wireless access communication link with customer premises equipment at a subscriber's residence. The wireless connectivity between the wireless base station and the customer premises equipment enables the user at the residence to access a remote network.

BRIEF DESCRIPTION OF EMBODIMENTS

In contrast to conventional techniques, embodiments herein provide novel ways of providing improved wireless communications to one or more mobile communication devices in a network environment.

For example, one embodiment herein includes a wireless station, a wireless access point, and communication management resource. The communication management resource establishes first wireless connectivity between the first wireless station and the second wireless station. The second wireless station is in communication with the wireless access point, which provides second wireless connectivity to multiple communication devices in a wireless network environment. During operation, the communication management resource measures link quality provided by the first wireless connectivity. Depending on the measured link quality provided by the first wireless connectivity, the communication management resource controls conveyance of communications over the second wireless connectivity.

In accordance with further embodiments, the first wireless connectivity and the second wireless connectivity can be implemented to support any of multiple different types wireless communication protocols. In one non-limiting example embodiment, the first wireless station and the second wireless station both register with a communication management resource that allocates CBRS (Citizens Broadband Radio Service) wireless channels. The first wireless connectivity can be implemented via one or more CBRS wireless channels that support wireless communications such as those based on LTE.

In accordance with yet further example embodiments, the second wireless station receives a message from the wireless access point; the message indicates a respective wireless communication protocol supported by the second wireless connectivity between the wireless access point and the mobile communication devices. Notification of the type of wireless communication protocol used to implement the second wireless connectivity enables the second wireless station to make decisions about implementation of allocation management with respect to the second wireless station and the wireless access point.

In accordance with further embodiments, the wireless access point controls allocation of resources over the second wireless connectivity during a first mode. In response to detecting degradation in the link quality provided by the first wireless connectivity, the communication management resource notifies the wireless access point of an override mode in which an allocation management resource associated with the second wireless station controls allocation of wireless resources associated with the second wireless connectivity to the mobile communication devices. Thus, during the override mode, the allocation management resource associated with the second wireless station controls allocation of wireless resources associated with the second wireless connectivity to the mobile communication devices.

In one non-limiting example embodiment, controlling the conveyance of communications over the second wireless connectivity based on the link quality includes: for a first duration of time, operating an allocation management resource associated with the second wireless station in a first mode (such as a standby mode) in which the wireless access point (and/or remote allocation management resource) controls allocation of wireless resources associated with the second wireless connectivity to the mobile communication devices; and for a second duration of time, operating the allocation management resource associated with the second wireless station in a second mode (such as an active mode) in which the allocation management resource associated with the second wireless station implements control of allocating wireless resources associated with the second wireless connectivity to the mobile communication devices in lieu of the allocation management resource associated with the wireless access point allocating wireless resources associated with the second wireless connectivity to the mobile communication devices.

In one embodiment, in order to implement allocation management, the allocation management resource associated with the second wireless station receives communication profile information produced by the wireless access point. The connection priority information indicates wireless data traffic requirements associated with the multiple communication devices. In accordance with the received communication profile information, the allocation management resource associated with the second wireless station adjusts the conveyance of communications over the second wireless connectivity in response to detecting that the measured link quality of the first wireless connectivity is below a threshold value.

In accordance with further embodiments, controlling conveyance of communications over the second wireless connectivity includes the allocation management resource associated with second wireless station communicating notifications to the mobile communication devices through the wireless access point. The notifications adjust allocation of wireless resources associated with the second wireless connectivity to the multiple communication devices depending on the measured link quality associated with the first wireless connectivity.

In accordance with still further embodiments, controlling conveyance of communications over the second wireless connectivity includes: modifying an allocation of wireless bandwidth resources provided by the second wireless connectivity, the allocation of the wireless bandwidth being commensurate with wireless bandwidth available over the first wireless connectivity. In other words, if the bandwidth provided by the first wireless connectivity reduces by 20%, the allocation management resource reduces an amount of bandwidth (of the second wireless connectivity) allocated to each of the mobile communication devices by 20%.

Still further embodiments herein include communicating allocation information from the allocation management resource to the mobile communication devices through the wireless access point, the allocation information being derived from the measured link quality associated with the first wireless connectivity. The allocation information reduces usage of bandwidth used by the mobile communication devices over the second wireless connectivity. Conversely, if more bandwidth becomes available over the first wireless connectivity, the allocation management resource can be configured to increase bandwidth allocated to each of the mobile communication devices.

Further embodiments herein include a first wireless station, a second wireless station, and a wireless access point. First wireless connectivity supports wireless communications between the first wireless station and the second wireless station. The second wireless station is in communication with the wireless access point, which provides second wireless connectivity to mobile communication devices. An allocation management resource associated with the second wireless station receives a performance metric. The performance metric indicates an ability of the first wireless connectivity to convey wireless communications. The allocation management resource communicates control messages to the mobile communication devices. The control messages indicate an allocation of wireless resources associated with the second wireless connectivity.

In accordance with further embodiments, the generated one or more performance metrics associated with the first wireless connectivity indicate a respective bandwidth capacity of the first wireless connectivity. Communicating the control messages includes: communicating a first control message to a first mobile communication device of the mobile communication devices, the first control message indicating first wireless bandwidth associated with the second wireless connectivity allocated to the first mobile communication device; and communicating a second control message to a second mobile communication device of the mobile communication devices, the second control message indicating second wireless bandwidth associated with the second wireless connectivity allocated to the first mobile communication device;

In one embodiment, the control messages reduce an amount of bandwidth in the second wireless connectivity allocated to the mobile communication devices. Conversely, the control messages from the allocation management resource to the mobile communication devices increase an amount of bandwidth in the second wireless connectivity allocated to the mobile communication devices.

In accordance with still further example embodiments, the allocation management resource communicates the control messages through the wireless access point and over the second wireless connectivity to the mobile communication devices.

By way of non-limiting example embodiment, the wireless network environment as described herein can be configured to implement fixed wireless access capability. In such an instance, the first wireless station is a CBRS base station (a.k.a., a CBSD), the second wireless station is customer premises equipment, and the wireless access point is a WiFi™ Access Point (AP).

The wireless access point is connected to the customer premises equipment through hardwired cable connection. The customer premises equipment is connected to the CBSD using a wireless RF connection (such as an over the air connection). Users operating mobile communication devices (in a subscriber domain such as a home) are connected to the WiFi™ access point to receive data in downlink and to send data in uplink.

In one embodiment, there is no communication between the customer premises equipment and the CBSD in terms of the amount of resources needed in the downlink. When there is high amount of downstream downlink traffic to the mobile communication devices, there might be congestion in the wireless link between the CBSD and the customer premises equipment. Also there might be WiFi™ users (mobile communication devices) consuming increasing amount of video traffic at home. From a resource management perspective, it is desirable that the WiFi™ access point sends large chunks of data each data for each wireless transmission, and relive network congestion and share the resources with other WiFi™ devices in the network.

In 802.11ax standard, the WiFi™ access point can assign RF resources based on the amount of traffic needed to be sent to the respective user equipment. Thus, according to embodiments herein, Wifi devices can receive the amount of data they need, Wifi devices do not have to have wait for the next data transmission opportunity.

This disclosure presents a new method to manage 802.11ax downlink resources (such as allocation of bandwidth over the wireless communication link between the wireless access point and the mobile communication devices) based on wireless resources of a RF resources available between the CBSD and the customer premises equipment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of wireless communications in a network environment. The instructions, when executed by computer processor hardware, cause the computer processor hardware (such as one or more co-located or disparately processor devices or hardware) to: establish first wireless connectivity between a first wireless station and a second wireless station, the second wireless station in communication with a wireless access point that provides second wireless connectivity to multiple communication devices; measure a link quality provided by the first wireless connectivity; and control conveyance of communications over the second wireless connectivity based on the measured link quality provided by the first wireless connectivity.

Another embodiment includes a computer readable storage medium and/or system having instructions stored thereon to facilitate control of wireless communications in a network environment. The instructions, when executed by computer processor hardware, cause the computer processor hardware (such as one or more co-located or disparately processor devices or hardware) to: establish first wireless connectivity between a first wireless station and a second wireless station, the second wireless station in communication with a wireless access point that provides second wireless connectivity to mobile communication devices; receive a performance metric, the performance metric indicating an ability to convey communications over the first wireless connectivity; and communicate control messages to the mobile communication devices, the control messages indicating allocation of wireless resources over the second wireless connectivity.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
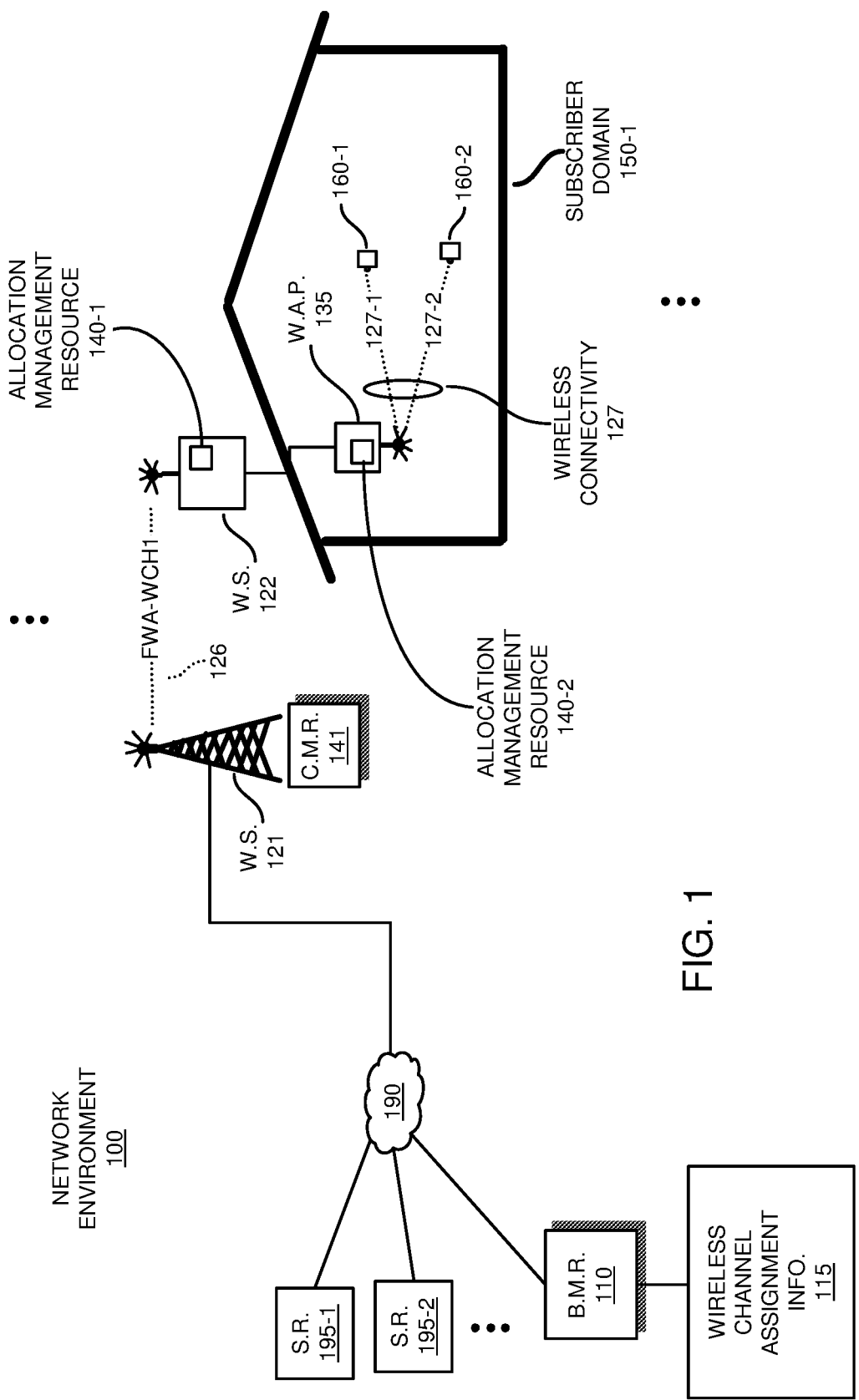
FIG. 1 is an example diagram illustrating a wireless network environment and communication management according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a wireless network environment includes a wireless station, a wireless access point, and communication management resource. The communication management resource establishes first wireless connectivity between the first wireless station and the second wireless station. The second wireless station is in communication with the wireless access point, which provides second wireless connectivity to multiple communication devices in a wireless network environment. The communication management resource measures link quality provided by the first wireless connectivity. Depending on the measured link quality provided by the first wireless connectivity, the communication management resource controls conveyance of communications over the second wireless connectivity.

Now, more specifically, FIG. 1 is an example diagram illustrating a wireless network environment and user equipment tracking according to embodiments herein.

As shown, network environment 100 includes subscriber domain 151, multiple wireless station 121, wireless station 122, and multiple mobile communication devices 160.

Note that each of the resources in network environment 100 can be configured to include or be configured as appropriate hardware, software, or combination of hardware and software to carry out respective operations as discussed herein.

More specifically, the bandwidth management resource 110 as described herein can be implemented via respective bandwidth management hardware and/or bandwidth management software; the communication management resource 141 can be implemented via respective communication management hardware and/or communication management software; each mobile communication device (160-1, 160-2, etc.) can be implemented via respective mobile communication hardware and/or mobile communication software; wireless access point 135 can be implemented via respective wireless access point hardware and/or wireless access point software; each wireless station (such as 121 and 122) can be implemented via respective wireless station hardware and/or wireless station software; allocation management resource 140-1 can be implemented via respective allocation management hardware and/or allocation management software; etc.

In this example embodiment, the bandwidth management resource 110 produces wireless channel assignment information 115 indicating allocation of wireless channel FWA-WCH1 to support wireless connectivity 126.

The mobile communication devices 160 have access to server resources 195 (such as server resource 195-1, server resource 195-2, etc.) via communications over a wireless communication path including wireless connectivity 127, wireless access point 135, wireless station 122, wireless connectivity 126, and network 190.

As further shown, the network environment 100 includes allocation management resource 140-1 and allocation management resource 140-2. Wireless station 122 implements allocation management resource 140-1; wireless access point 135 implements allocation management resource 140-2.

Figure 2:
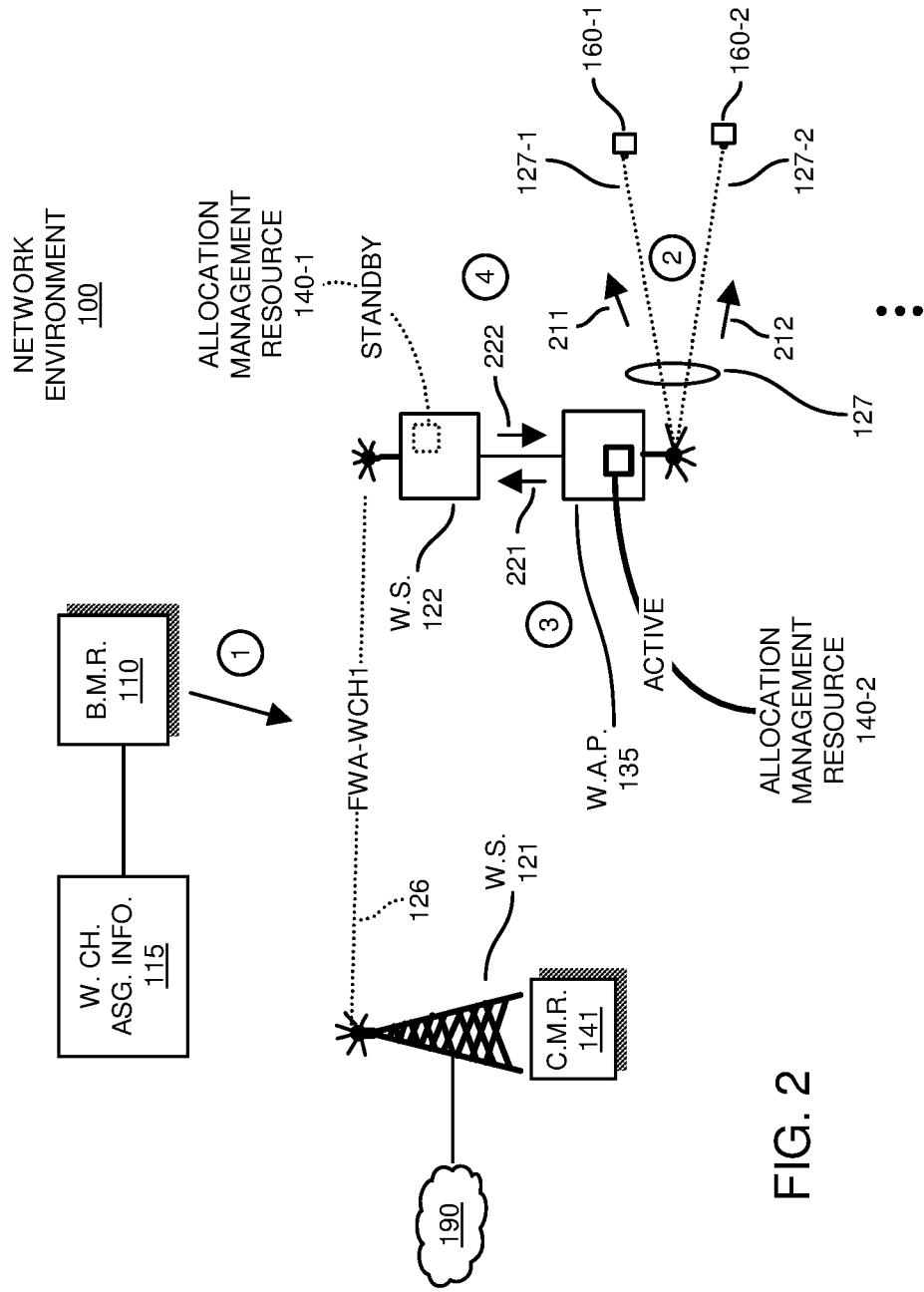
FIG. 2 is an example diagram illustrating control of bandwidth allocated to multiple communication devices via a first allocation management resource according to embodiments herein.

FIG. 2 is an example diagram illustrating control of bandwidth allocated to multiple communication devices via a first allocation management resource according to embodiments herein.

In operation #1 of FIG. 2, the wireless station 121 (such as implemented via corresponding communication management resource 141) and wireless station 122 (such as implemented via a corresponding communication management resource) in the wireless network environment 100 register with the bandwidth management resource 110 (such as a Spectrum Access System other suitable bandwidth allocation resource).

Assume in this example embodiment that the bandwidth management resource 110 allocates use of one or more wireless channels such as wireless channel #1 to the wireless station 121 and wireless station 122.

In one embodiment, via wireless channel #1 (such as a CBRS wireless channel or other suitable wireless resource), the first wireless connectivity 126 supports fixed wireless access (such as via LTE or other suitable wireless communication protocol) between the wireless station 121 and the wireless station 126 (such as a fixed wireless access point).

The wireless access point 135 (such as supporting WiFi™ or other suitable wireless communication protocol) establishes connectivity with the wireless station 122 (or vice-versa).

The wireless access point 135 provides wireless connectivity 127 to the mobile communication devices 160. For example, the first wireless communication link 127-1 between the wireless access point 135 and the mobile communication device 160-1 supports first wireless communications; the second wireless communication link 127-2 between the wireless access point 135 and the mobile communication device 160-2 supports first wireless communications; and so on.

Wireless access point 135 includes allocation management resource 140-2. As shown in FIG. 2, while in the active mode, the allocation management resource 140-2 controls allocation of bandwidth supplied to each of the mobile communication devices 160 over time.

In one embodiment, the allocation management resource 140-2 communicates notification of allocated bandwidth associated with wireless connectivity 127 to each of the mobile communication devices 160. For example, via communications 211, the allocation management resource 140-2 notifies the mobile communication device 160-1 of first wireless resources (such as bandwidth, scheduled durations of time, etc.) associated with the wireless connectivity 127 that are allocated to the mobile communication device 160-1 over time; via communications 212, the allocation management resource 140-2 notifies the mobile communication device 160-2 of second wireless resources (such as bandwidth, scheduled durations of time, etc.) associated with wireless connectivity 127 that are allocated to the mobile communication device 160-2 over time; and so on.

As further shown, via communications 221, the wireless access point 135 notifies the wireless station 122 of the particular one or more wireless communication protocols supported by the wireless access point 135.

In one example embodiment, assume that the wireless access point 135 notifies the wireless station 122 that the wireless access point 135 supports wireless standard 802.11ax. This triggers the wireless station 122 to potentially operate the allocation management resource 140-1 in an active mode on an as-needed basis.

In accordance with further example embodiments, in response to receiving the communications 221 indicating support of a particular wireless communication protocol, the wireless station 122 transmits communication 222 to the wireless access point 135.

In one nonlimiting example embodiment, via communications 222, the wireless station 122 communicates an 'Over the air dynamic resource management message' to wireless access point 135. Such a message notifies the wireless access point 135 that the number of wireless resource units (RUs) will be dynamically assigned to each of the mobile communication devices 160 (user equipment) based on the RF (Radio Frequency) link quality (such as capacity) of wireless connectivity 126 available to support communications between the wireless station 121 (such as a CBSD) and wireless station 122 (such as customer premises equipment).

Figure 3:
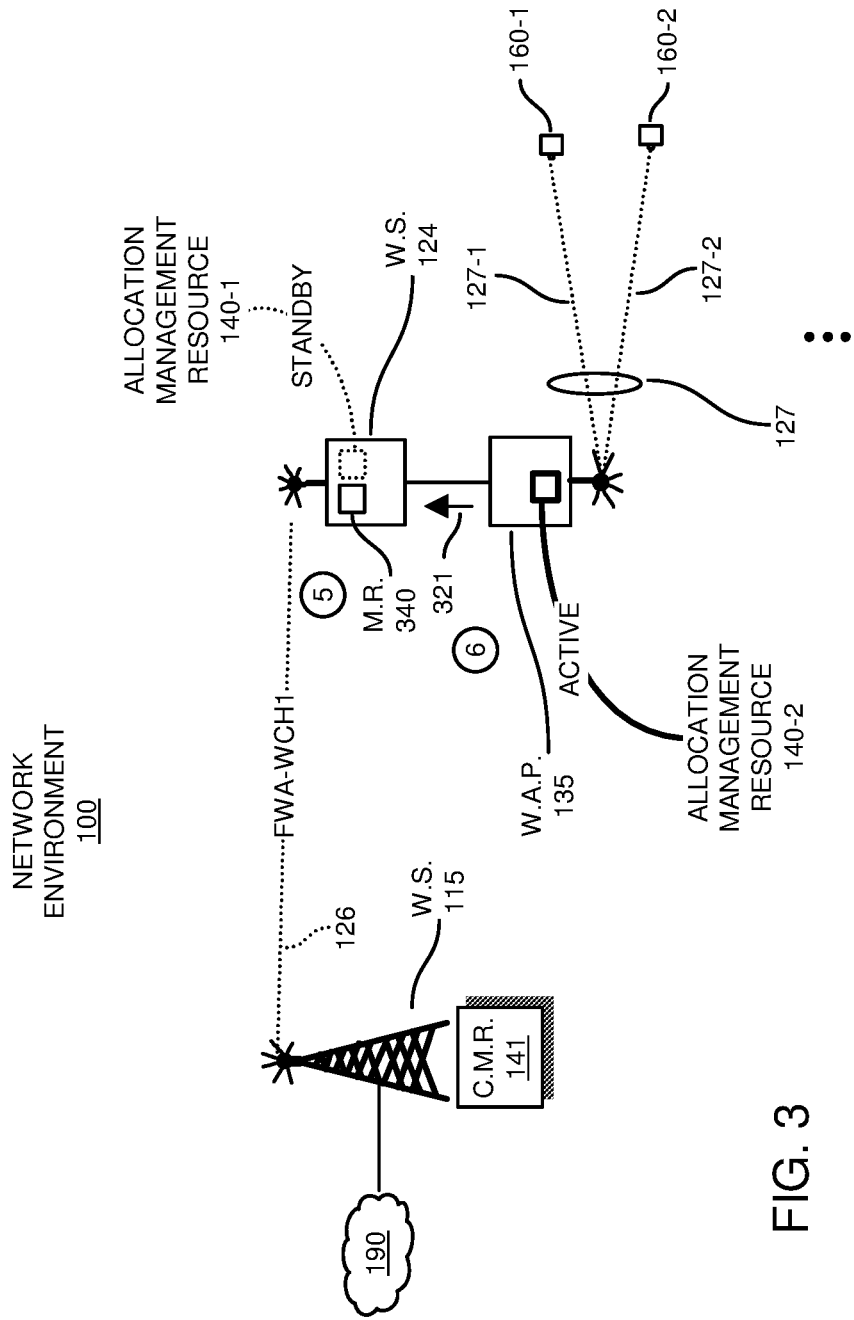
FIG. 3 is an example diagram illustrating monitoring of link quality provided by first wireless connectivity according to embodiments herein.

FIG. 3 is an example diagram illustrating monitoring of a link quality provided by first wireless connectivity according to embodiments herein.

As further shown, the wireless station 122 includes monitor resource 340. During operation, the monitor resource 340 measures a quality (such as link capacity) associated with the wireless connectivity 126 between the wireless station 121 and wireless station 122.

In one embodiment, the monitor resource 340 implements link quality calculations (such as link capacity calculation) based on parameters such as how many downlink physical resource blocks (PRB) associated with wireless connectivity 126 are determined to be free, an average CQI (Channel Quality Indicator) associated with the wireless connectivity 126, average MCS (Modulation Coding Scheme) associated with the wireless connectivity 126, average block error rate (a.k.a., BLER) associated with wireless connectivity 126, and so on.

The wireless station 122 (or other suitable resource) keeps track of information associated with each of the mobile devices 160. For example, in one embodiment, the wireless access point 135 tracks, for each of one or more mobile communication devices 160, one or more parameters of information such as: i) identities of the mobile communication devices, ii) an amount of data retrieved by each of the mobile communication devices, iii) a respective one or more types of data traffic retrieved by the mobile communication devices, iv) an amount of traffic over the wireless connectivity 121 that is destined for delivery to or transmitted from a respective mobile communication device, v) duration of traffic, etc.

In one embodiment, the wireless access point 135 or other suitable resource generates respective traffic profile information (example in FIG. 4) for each of the mobile communication devices 160 provided wireless service over wireless connectivity 127. Via communications 321, the wireless station 122 transmits this profile information to the wireless access point 135. If desired, the wireless access point 135 repeatedly communicates updated traffic profile information associated with the mobile communication devices 160 to the wireless station 340.

Based on such profile information, the wireless access point 135 notifies the wireless station 122 of the attributes associated with the mobile communication devices 160 that it is providing wireless connectivity 127.

As shown, the allocation management resource 140-1 operates in a standby mode when the link quality associated with the wireless connectivity 126 is above a respective threshold value. In such an instance, the allocation management resource 140-2 controls allocation of wireless bandwidth associated with the wireless connectivity 127 to the mobile communication devices 160.

Figure 4:
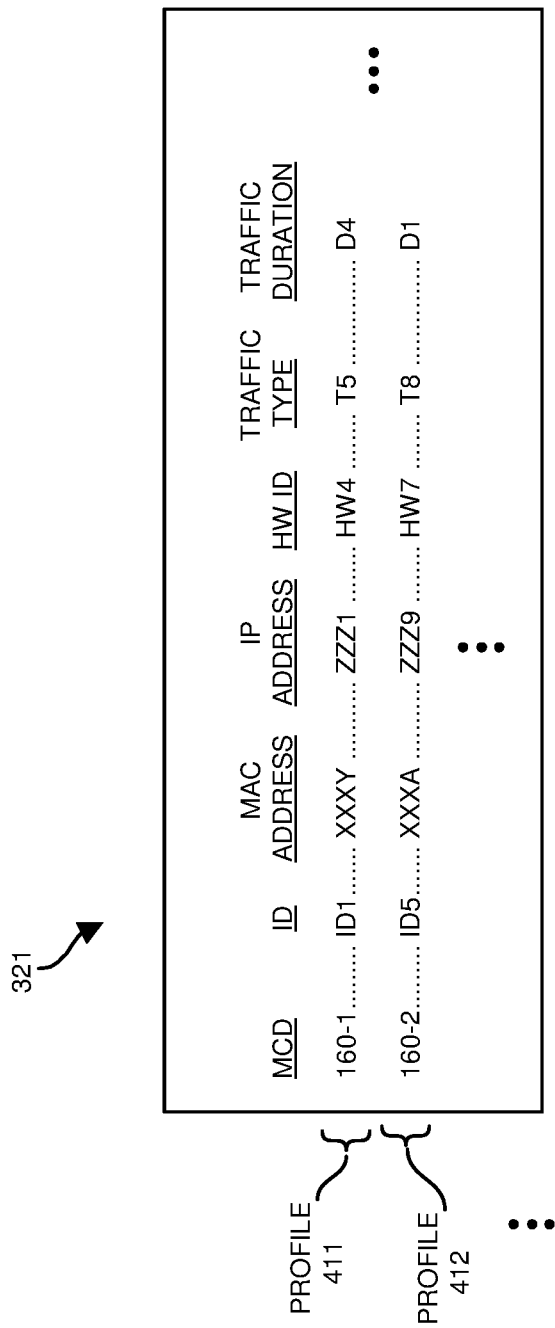
FIG. 4 is an example diagram illustrating profile information according to embodiments herein.

FIG. 4 is an example diagram illustrating profile information according to embodiments herein.

As previously discussed, the wireless access point 135 or other suitable resource generates communication profile information associated with each of the mobile communication devices 160. Such information is useful because it is used as a basis to determine how to divide wireless resources (such as so-called wireless resource units) associated with the wireless connectivity 127 to each of the mobile communication devices 160.

In one embodiment, a Resource Unit (RU) is a unit in OFDMA (Orthogonal Frequency Division Multiple Access) that denotes a group of subcarriers (tones) used in both DownLink (DL) and UpLink (UL) transmissions wireless communication protocol 802.11ax.

According to the OFDMA wireless communication protocol, different transmit powers may be applied to different RUs. There are maximum of 9 RUs for 20 MHz bandwidth, 18 in case of 40 MHz and more in case of 80 or 160 MHz bandwidth. In general, an RU (i.e., available wireless resources) enables control of multiple mobile communication devices and corresponding access to a wireless access point. Controlling the allocation of wireless resources (such as RUs) to the mobile communication devices ensures efficient use of the available wireless bandwidth supporting wireless connectivity 127.

Further in this example embodiment, the wireless access point 135 or other suitable resource provides corresponding profile information associated with the mobile communication devices 160 to the allocation management resource 140-1 via communications 321.

As shown in FIG. 4, the communication includes profile information associated with each mobile communication device coupled of the wireless access point 135.

For example, profile information 411 includes ID=ID1 assigned to the mobile communication devices 160-1; profile information 411 includes network address information such as MAC address XXXY and IP address ZZZ1 assigned to the mobile communication device 160-1; profile information 411 indicates a hardware ID value of HW4 assigned of the mobile communication device 160-1; profile information 411 indicates that the mobile communication device 160-1 supports traffic type T5; the profile information 411 indicates that the mobile communication device 160-1 requires a traffic duration of D4; and so on.

Profile information 412 includes ID=ID5 assigned to the mobile communication device 160-2; profile information 412 includes network address information such as MAC address XXXA and IP address ZZZ9 assigned to the mobile communication device 160-2; profile information 412 indicates a hardware ID value of HW7 assigned to the mobile communication device 160-2; profile information 412 indicates that the mobile communication device 160-2 supports traffic type T8; the profile information 412 indicates that the mobile communication device 160-2 requires a traffic duration of D1; and so on.

As further discussed herein, the profile information associated with the mobile communication devices indicates different amounts of bandwidth to be allocated to each of the mobile communication devices 160.

Figure 5:
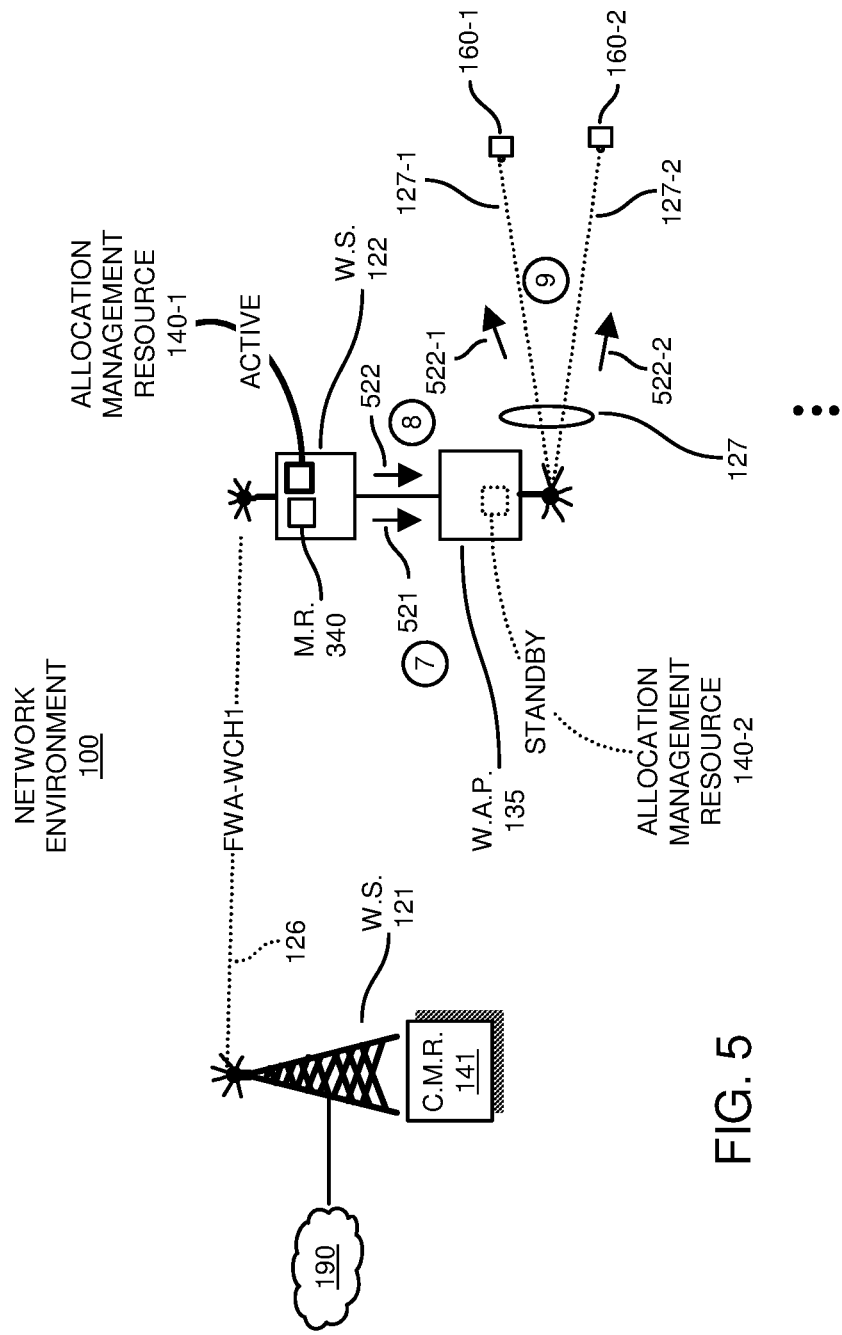
FIG. 5 is an example diagram illustrating switchover from a first allocation management resource to a second allocation management resource in response to detecting degradation of link quality associated with the first wireless connectivity according to embodiments herein.

FIG. 5 is an example diagram illustrating switchover from a first allocation management resource to a second allocation management resource in response to detecting degradation of link quality associated with the first wireless connectivity according to embodiments herein.

As previously discussed, via communications 321, the allocation management resource 140-1 in wireless station 121 or other suitable resource receives communication profile information 411, 412, etc., associated with the mobile communication devices 160 from the wireless access point 135. The communication profile information indicates wireless data traffic requirements associated with the multiple communication devices.

As further discussed herein, via the profile information associated with each mobile communication device, the allocation management resource 140-1 identifies the traffic consumption needs or settings associated with each of the mobile communication devices 160.

Via communications 521, in response to detecting that the link quality associated with the wireless connectivity 126 falls below a threshold value, the wireless station 122 (such as monitor resource 340) notifies the allocation management resource 140-2 to operate in a standby mode. The allocation management resource 140-1 is set to the active mode.

Via communications 522, based on the previously and repeatedly received profile information associated with the mobile communication devices 160, the allocation management resource 140-1 adjusts the conveyance of communications over the second wireless connectivity 127 in response to detecting that the measured link quality of the first wireless connectivity 126 is below a threshold value.

In one embodiment, prior to switchover to operating the allocation management resource 140-1 in the active mode, the wireless station 122 communicates a message to the wireless access point 135 during conditions in which the link quality associated with wireless connectivity 126 is above a threshold value. For example, in such an instance, the communication notifies the wireless access point 135 to maintain a current wireless resource allocation assigned to the mobile communication devices during conditions in which there is enough capacity over wireless connectivity 126 between the wireless station 121 (CBSD) and the wireless station 122 (customer premises equipment) that there is no need to change current resource allocation assignments.

In one embodiment, if there is sufficient bandwidth in wireless connectivity 126 to support wireless communications from the wireless access point 135 to the mobile communication devices, the wireless station 122 does not need to attempt to increase bandwidth associated with the wireless connectivity 126.

In accordance with further embodiments, assume that the monitor resource 340 detects that the performance associated with the wireless connectivity 126 falls below a threshold value. In such an instance, the wireless station 122 communicates a message to the wireless access point 135 indicating that the allocation management resource 140-1 is now in an active state and that the allocation management resource 140-2 is to switch to the standby mode. In a manner as previously discussed, the allocation management resource 140-1 now controls the allocation of wireless resources associated with the second wireless connectivity 127 to the mobile communication devices 160.

In one embodiment, in response to detecting a 20% reduction of wireless bandwidth in the wireless connectivity 126, the allocation management resource 140-1 reduces the wireless bandwidth allocated to the mobile communication devices 160 by 20%. In response to detecting a 30% reduction of wireless bandwidth in the wireless connectivity 126, the allocation management resource 140-1 reduces the wireless bandwidth allocated to the mobile communication devices 160 by 30%.

In one embodiment, as an alternative to reducing bandwidth allocated to the mobile communication devices when the wireless connectivity 126 is congested, the allocation management resource 140-1 attempts to increase the quality of the wireless connectivity 126 in order to provide the mobile communication devices 160 appropriate bandwidth.

To achieve this, in response to detecting that the RF link capacity associated with wireless connectivity 126 between the wireless station 122 and the wireless station 121 is not sufficient to convey the traffic between the wireless access point 135 and the mobile communication devices 160, the wireless station 122 attempts to increase the conveyance capacity (link quality) of the wireless connectivity 126 by communicating a request to the wireless station 121 to use a higher MCS level in respective downlink transmissions. However, asking for higher MCS levels might cause a higher BLER associated with the wireless connectivity 126, since channel is not well enough to send bits without any error. If there is an increase in BLER when implementing higher modulation coding to communications conveyed over the wireless connectivity 126, then the wireless station 122 will revert back to using the original MCS setting. If there is no degradation in the block error rate of communicating wireless data over the wireless connectivity 126, then allocation management resource 140-1 notifies the allocation management resource 140-2 to operate in the active mode again while the allocation management resource 140-1 is set to standby mode.

Yet further embodiments herein include, during a condition in which the wireless station 122 is unable to increase the quality of the wireless connectivity 126 (via changing wireless communication link settings) to an appropriate threshold level in a manner as previously discussed, the allocation management resource 140-1 communicates one or more bandwidth allocation control messages (to the mobile communication devices 160) that adjust (such as reduce or increase) the amount of wireless bandwidth allocated to the mobile communication devices by the wireless station 122. Recall that the addresses and bandwidth requirements of each of the mobile communication devices 160 is known to the allocation management resource 140-1 via the previously received profile information. Embodiments herein include the amount communicating appropriate bandwidth usage and control messages to each of the mobile communication devices 160.

For this case, the wireless station 122 senses that there is potential trend for capacity degradation in the wireless connectivity 126. Therefore, the allocation management resource 140-1 reduces the capacity of a respective mobile communication device (such as mobile communication device 160-1) that is consuming the highest amount of data traffic first before reducing the capacity provided to each of the other mobile communication devices. Alternatively, as previously discussed, the allocation management resource 140-1 reduces bandwidth provided to the mobile communication devices 160 on an as-needed basis such that the amount of bandwidth allocated to the mobile communication devices 160 over the wireless connectivity 127 substantially matches (such as within 10% of point or other suitable value) an amount of bandwidth in the wireless connectivity 126 allocated for use to the mobile communication devices 160.

Note that the switching between operating the allocation management resources 140-1 and 140-2 between the active and standby modes as described herein is useful because the wireless access point 135 may not have appropriate resources and therefore the ability to adjust the allocation of bandwidth to the mobile communication devices 160 quickly enough.

In this example embodiment, assume that during a normal mode when the allocation management resource 140-2 is active such as in FIG. 2, the wireless connectivity supports a total of 30 MBPS (Mega Bits Per Second), 20 MBPS are allocated by the allocation management resource 140-2 to the mobile communication device 160-1 and 10 MBPS are allocated by the allocation management resource 140-2 to the mobile communication device 160-2. In such an instance, the wireless connectivity 126 supports a total of 30 MBPS.

Assume that the monitor resource 340 detects that the bandwidth available in wireless connectivity 126 drops to 15 MBPS (drop to below a threshold value of 20 MBPS), causing the switchover to activation of the allocation management resource 140-1 and operation of the allocation management resource 140-1 in the standby mode. In this instance, due to the drop in bandwidth below the threshold value of 20 MBPS, the allocation management resource 140-1 reduces the bandwidth allocated over the wireless connectivity 127 to the mobile communication devices.

More specifically, in response to the detected bandwidth reduction associated with the wireless connectivity 126, and because the wireless connectivity 126 only supports a total of 15 MBPS (Mega Bits Per Second), the allocation management resource 140-1 reduces bandwidth allocation to 10 MBPS to the mobile communication device 160-1 and 5 MBPS to the mobile communication device 160-2. Thus, via input from the monitor resource 340, and to accommodate the congestion condition, the allocation management resource 140-1 reduces bandwidth allocation to the mobile communication devices 160.

Figure 6:
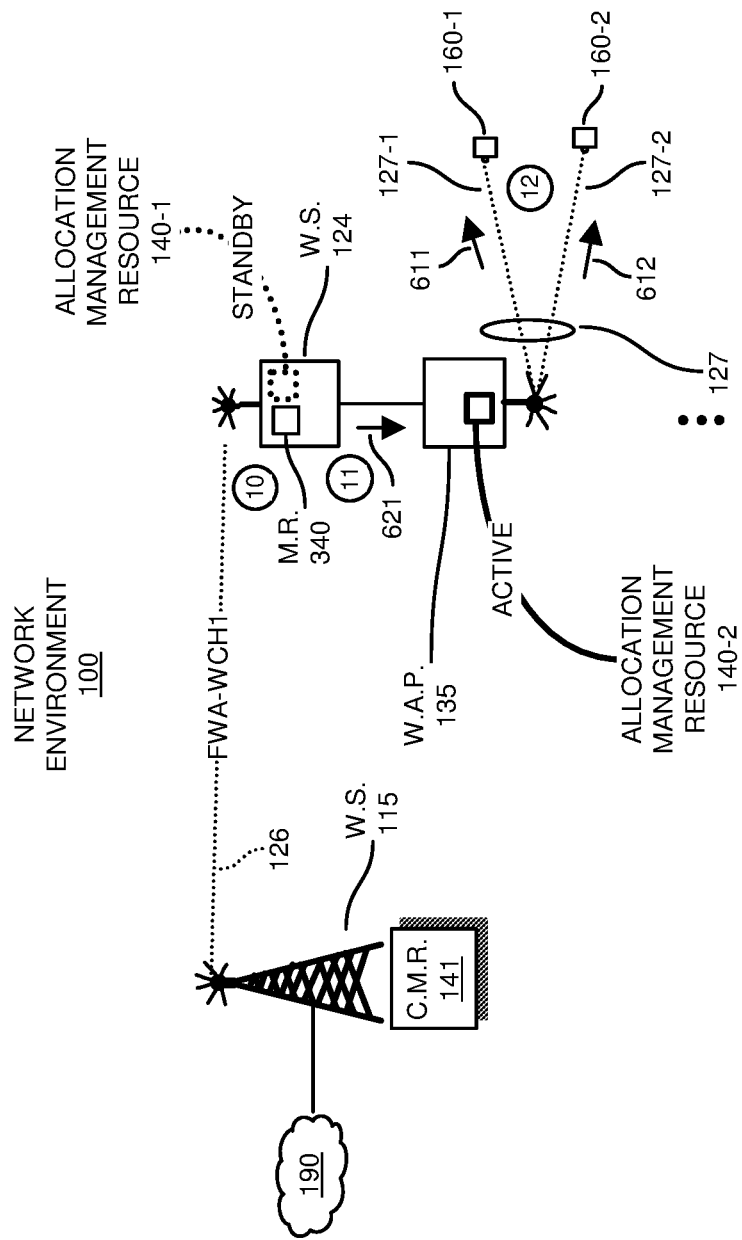
FIG. 6 is an example diagram illustrating switchover from the second allocation management resource to the first allocation management resource in response to detecting restoration of link quality associated with the first wireless connectivity according to embodiments herein.

FIG. 6 is an example diagram illustrating switchover from the second allocation management resource to the first allocation management resource in response to detecting restoration of link quality associated with the first wireless connectivity according to embodiments herein.

In processing operation #10, while the allocation management resource 140-1 and allocation management resource is inactive (standby), assume that the monitor resource 340 detects that the link quality associated with the wireless connectivity 126 raises above a threshold value and is now able to provide sufficient wireless bandwidth to the wireless station 124. In such an instance, in processing operation #11, the monitor resource 340 or other suitable resource transmits communications 621 to the wireless access point 135.

In one embodiment, the communications 621 include a command notifying the allocation management resource 140-2 to operate in the active mode again in which the allocation management resource 140-2 is configured to generate control communications to the mobile communication devices 160. In a manner as previously discussed, the control communications control an amount of bandwidth resources associated with the wireless connectivity 127 allocated to the mobile communication devices for use.

More specifically, in response to switching over to the active mode, the allocation management resource 140-2 transmits communications 611 to the mobile communication device 160-1. The communications 611 indicate allocation of wireless resources of the wireless connectivity 127 allocated to the mobile communication device 160-1 (as allocated by the allocation management resource 140-2). The allocation management resource 140-2 transmits communications 622 to the mobile communication device 160-2. The communications 622 indicate allocation of wireless resources of the wireless connectivity 127 allocated to the mobile communication device 160-2.

Thus, embodiments herein include measuring a link quality (as determined by the monitor resource 340) provided by the first wireless connectivity and controlling conveyance of communications over the second wireless connectivity 127 based on the measured link quality as indicated by the monitor resource 340.

Figure 7:
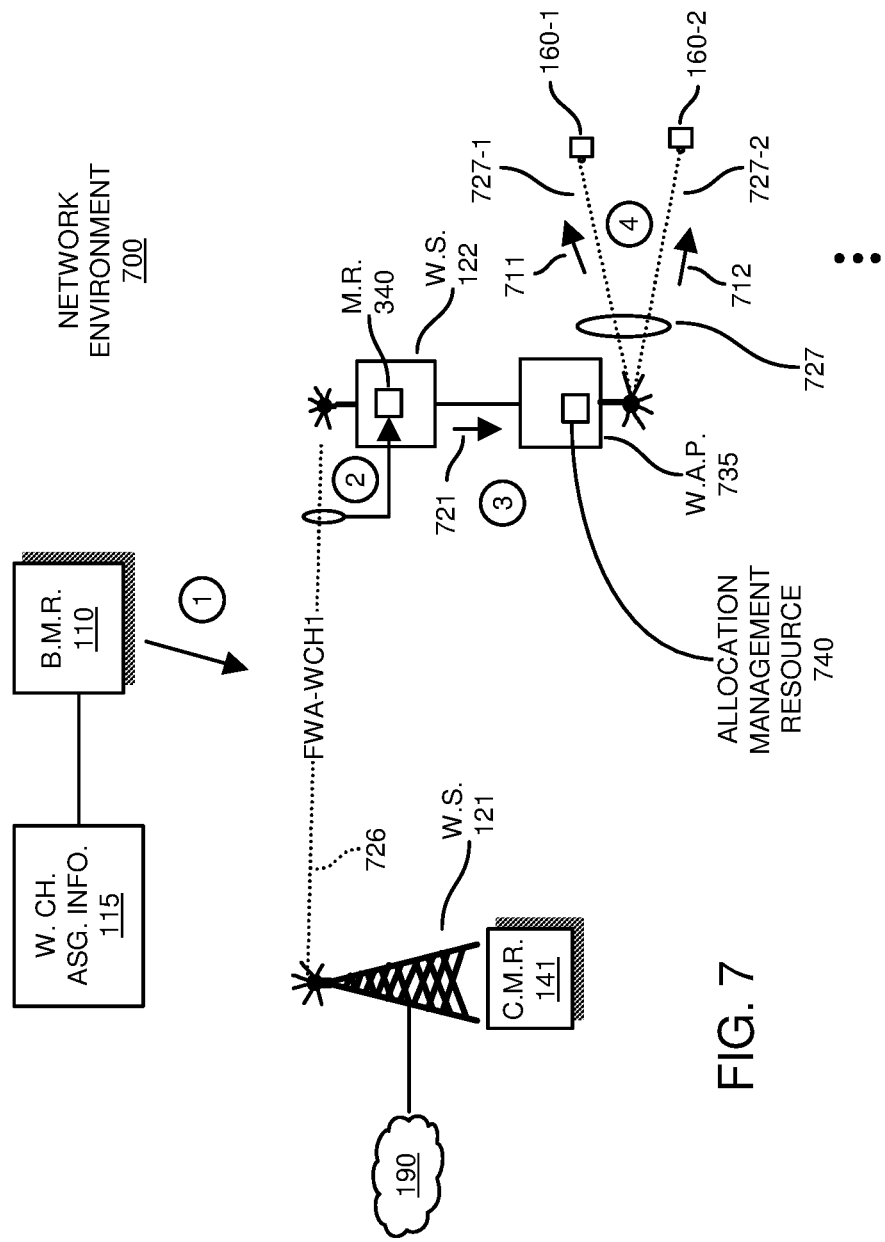
FIG. 7 is an example diagram illustrating control of wireless resources to mobile communication device over second wireless connectivity based on monitoring of link quality associated with a first wireless connectivity.

FIG. 7 is an example diagram illustrating control of wireless resources to mobile communication device over second wireless connectivity based on monitoring of link quality associated with a first wireless connectivity.

This example embodiment illustrates that the allocation management resource 140 need not be split and can reside at any suitable location. For example, instead of being split into two components (such as allocation management resource 140-1 and allocation management resource 140-2), the allocation management resource 740 can be configured to reside in the wireless access point 735. Alternatively, the allocation management resource 740 can reside in the wireless station 722.

In a manner as previously discussed, in operation #1 of FIG. 7, the wireless station 121 (and communication management resource 141) and wireless station 122 in the wireless network environment 100 register with the bandwidth management resource 110 (such as a Spectrum Access System associated with a CBRS system or other suitable bandwidth allocation resource). The bandwidth management resource 110 allocates use of one or more wireless channels such as wireless channel #1 to the wireless station 121 and wireless station 122.

In one embodiment, via at least wireless channel #1 (such as a CBRS wireless channel #1), the first wireless connectivity 726 supports fixed wireless access (such as via LTE or other suitable wireless communication protocol) between the wireless station 121 and the wireless station 126 (such as a fixed wireless access point).

The wireless access point 135 (such as supporting WiFi™ or other suitable wireless communication protocol) establishes connectivity with the wireless station 122. The wireless access point 135 provides wireless connectivity 127 to the mobile communication devices 160. For example, the first wireless communication link 727-1 between the wireless access point 135 and the mobile communication device 160-1 supports first wireless communications; the second wireless communication link 727-2 between the wireless access point 135 and the mobile communication device 160-2 supports second wireless communications; and so on.

Accordingly, embodiments herein include establishing first wireless connectivity 726 between a first wireless station 721 and a second wireless station 722, the second wireless station 722 being in communication with a wireless access point 735 that provides second wireless connectivity 727 to mobile communication devices 160.

In accordance with further example embodiments, in a manner as previously discussed, the monitor resource 340 monitors link quality associated with wireless connectivity 726.

For example, in a manner as previously discussed, the monitor resource 340 measures a quality (such as link capacity) associated with the wireless connectivity 726 between the wireless station 721 and wireless station 722. In one embodiment, the link quality calculation (such as link capacity calculation) is generated based on parameters such as how many downlink physical resource blocks (PRB) associated with wireless connectivity 726 are determined to be free, an average CQI (Channel Quality Indicator), average MCS (Modulation Coding Scheme), average block error rate (a.k.a., BLER), etc.

In one embodiment, the monitor resource 340 generates one or more performance metrics (such as link quality calculation) indicating an ability of the wireless connectivity 726 to support communications on behalf of the mobile communication devices 160. In other words, as previously discussed, a portion of the bandwidth over wireless connectivity 726 is allocated for use to support communications associated with the mobile communication devices 160 through the wireless access point 735.

Via communications 721, the wireless station 122 or other suitable resource communicates the link quality metric (or one or more performance metrics) associated with the wireless connectivity 726 to the allocation management resource 740. In one embodiment, the one or more performance metrics indicates information such as wireless bandwidth, scheduled time slots, scheduled time durations, etc., allocated to the wireless access point 740 and/or corresponding mobile communication devices 160.

Thus, the wireless access point 735 (allocation management resource 740) receives the performance metric indicating an ability (as captured by the link quality performance metric) to convey communications over the first wireless connectivity 726.

The performance information (such as one or more metrics) produced by the monitor resource 340 indicate any suitable communication parameter such as a bandwidth capacity of the first wireless connectivity. Depending on the link quality associated with the first wireless connectivity, and availability of wireless resources in the wireless connectivity 726, the allocation management resource controls allocation of available wireless resources associated with the wireless connectivity 727 to the mobile communication devices 160.

In accordance with further embodiments, the wireless station 722 (or other suitable resource) keeps track of information associated with each of the mobile devices 160. For example, in one embodiment, the wireless access point 735 tracks, for each of one or more mobile communication devices 160, one or more parameters of information such as: i) identities of the mobile communication devices, ii) an amount of data retrieved by each of the mobile communication devices, iii) a respective one or more types of data traffic retrieved by the mobile communication devices, iv) an amount of traffic over the wireless connectivity 727 that is destined for delivery to or transmitted from a respective mobile communication device, v) duration of traffic, etc.

The allocation management resource 740 uses the link quality information (such as one or more performance metrics) associated with wireless connectivity 726 as a basis to control mobile communication devices' 160 usage of wireless connectivity 727 to transmit and/or receive data.

More specifically, depending on the link quality information calculated for the wireless connectivity 726 and corresponding performance metrics, the allocation management resource 740 generates and communicates respective one or more control communications (messages) to the mobile communication devices 160. The control messages (such as communications 711 and 712) indicate allocation of wireless resources associated with the second wireless connectivity 727 to the mobile communication devices 160.

More specifically, the allocation management resource 740 transmits communications 711 (first allocation messages) to the mobile communication device 160-1. The communications 711 from allocation management resource 740 to the mobile communication device 160-1 control an amount of wireless capacity (such as amount of time used, bandwidth, etc.) associated with wireless connectivity 727 (and thus wireless connectivity 726 because they are related) used by the mobile communication device 160-1 to transmit and/or receive data.

Similarly, the communications 712 from allocation management resource 740 to the mobile communication device 160-2 control an amount of wireless capacity (such as amount of time used, bandwidth, etc.), associated with wireless connectivity 727 (and thus wireless connectivity 726 because they are interrelated) used by the mobile communication device 160-2 to transmit and/or receive data.

The control messages communicated to the mobile communication devices 160 can be or include any suitable information. By way of non-limiting example embodiment, the control messages are optionally so-called trigger frames used to deliver RU (Resource Units) allocation information in the user information field, to each respective mobile communication device.

As previously discussed, the control messages communicated to the mobile communication devices 160 indicate allocation settings such as an amount of bandwidth allocated for use by each of the mobile communication devices. For example, in one embodiment, via communications 711, the allocation management resource 740 (and wireless access point 135) communicates a first control message to mobile communication device 160-1; the first control message indicates first wireless bandwidth associated with the second wireless connectivity 727 allocated to the first mobile communication device 160-1.

Via communications 712, the allocation management resource 740 (and wireless access point 135) communicates a second control message to the mobile communication device 160-2; the second control message indicates second wireless bandwidth associated with the second wireless connectivity allocated to the first mobile communication device 160-2.

Note again that the allocation control messages communicated to the mobile communication devices 160 can be or include any suitable information. By way of non-limiting example embodiment, the control messages are so-called trigger frames used to deliver RU (Resource Units) allocation information in the user information field, to each respective mobile communication device.

Accordingly, embodiments herein include communicating control messages (such as communications 711, 712, etc.) over the second wireless connectivity 727 to the mobile communication devices 160. In response to the monitor resource 340 detecting congestion (such as a reduction in available bandwidth associated with wireless connectivity 726) and an inability to provide appropriate bandwidth to the mobile communication devices 160 over the second wireless connectivity 727, the allocation management resource 740 (or other suitable resource) generates and communicates control messages to the mobile communication devices that reduce an amount of bandwidth in the second wireless connectivity 727 allocated to the mobile communication devices 160.

Figure 8:
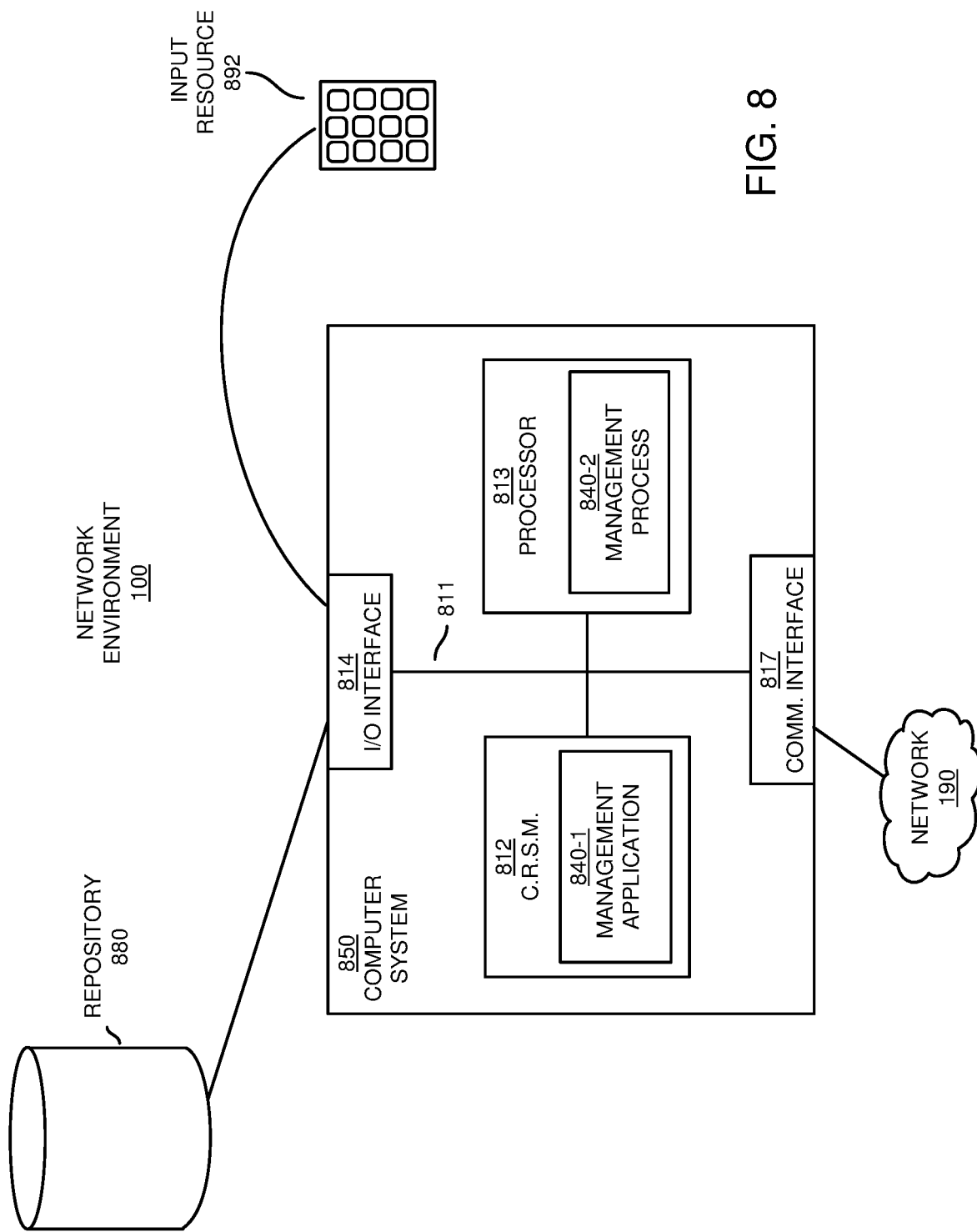
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions (such as management application 840-1 and management process 840-2) to carry out the different operations as discussed herein.

As shown, computer system 850 of the present example includes an interconnect 811 that coupling computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 840-1 (e.g., including instructions) to carry out any of the operations (such as associated with the monitor resource 340, allocation management resource 840-1, allocation management resource 840-2, wireless station 122, wireless station 121, wireless access point 135, etc.) as discussed herein.

During operation of one embodiment, processor 813 accesses computer readable storage media 812 via the use of interconnect 811 in order to launch, run, execute, interpret or otherwise perform the instructions in management application 840-1 stored on computer readable storage medium 812. Execution of the management application 840-1 (such as implementation of allocation management resource 840, monitor resource 340, etc.) produces management process 840-2 to carry out any of the operations and/or processes as discussed herein.

Those skilled in the art will understand that the computer system 850 can include other processes and/or software and hardware components, such as an operating system that controls allocation and use of hardware resources to execute management application 840-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
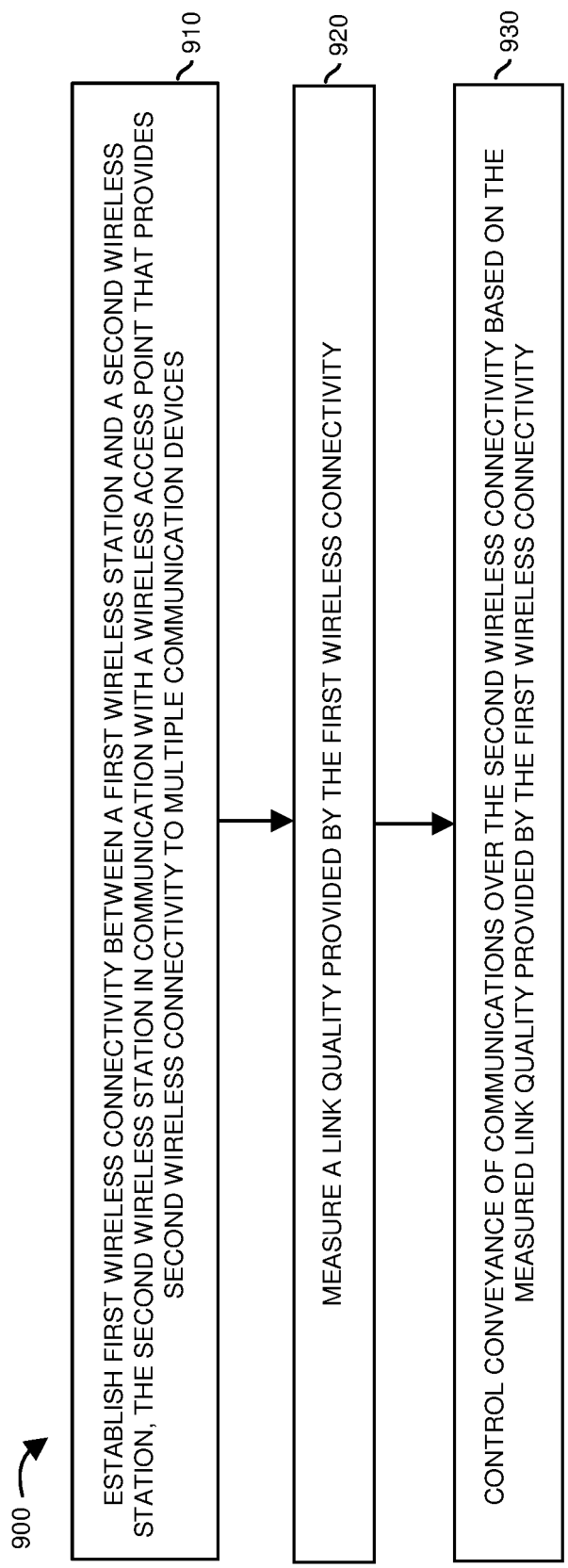
FIG. 9 is an example diagram illustrating a method according to embodiments herein.

FIG. 9 is a flowchart 900 illustrating an example method according to embodiments. Note that there will be some overlap with respect to concepts as discussed above.

In processing operation 910, a communication management resource associated with wireless station 121 or 122 establishes first wireless connectivity 126 between a first wireless station 121 and a second wireless station 122. The second wireless station 122 is in communication with a wireless access point 135 that provides second wireless connectivity 127 to multiple communication devices 160.

In processing operation 920, the monitor resource 340 measures a link quality provided by the first wireless connectivity 126.

In processing operation 930, the allocation management resource 140-1 controls conveyance of communications over the second wireless connectivity 127 based on the measured link quality information provided by the first wireless connectivity 126.

Figure 10:
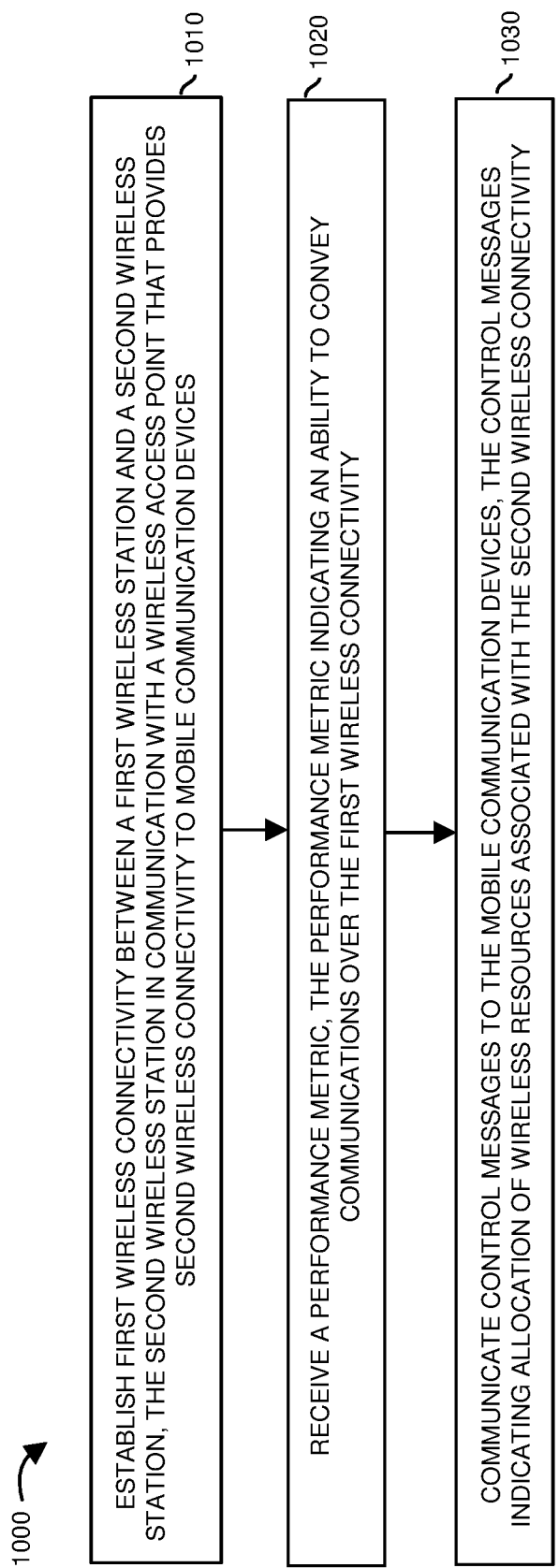
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication management resource establishes first wireless connectivity 126 between a first wireless station 121 and a second wireless station 122. The second wireless station 122 is in communication with a wireless access point 135 that provides second wireless connectivity 127 to mobile communication devices 160.

In processing operation 1020, the allocation management resource 740 receives a performance metric indicating an ability (such as determined based on link quality) to convey communications over the first wireless connectivity 126.

In processing operation 1030, the allocation management resource 140 communicates control messages (such as over the second wireless connectivity) to the mobile communication devices 160. The control messages indicate wireless resources associated with the second wireless connectivity 127 allocated to the mobile communication devices 160.

Note again that techniques herein are well suited to facilitate allocation of wireless resources to mobile communication devices. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   establishing first wireless connectivity between a first wireless station and a second wireless station, the second wireless station in communication with a wireless access point that provides second wireless connectivity to multiple communication devices;
   measuring a link quality provided by the first wireless connectivity; and
   controlling conveyance of communications over the second wireless connectivity based on the measured link quality provided by the first wireless connectivity.

2. The method as in claim 1 further comprising:
   receiving communication profile information from the wireless access point, the communication profile information indicating wireless data traffic requirements associated with the multiple communication devices; and
   adjusting the conveyance of communications over the second wireless connectivity in response to detecting that the measured link quality of the first wireless connectivity is below a threshold value.

3. The method as in claim 1, wherein controlling conveyance of communications over the second wireless connectivity includes:
   communicating notifications to the mobile communication devices, the notifications adjusting allocation of wireless resources of the second wireless connectivity to the multiple communication devices depending on the measured link quality.

4. The method as in claim 1, wherein controlling conveyance of communications over the second wireless connectivity includes:
   modifying an allocation of wireless bandwidth associated with the second wireless connectivity, the allocation of the wireless bandwidth being commensurate with wireless bandwidth available over the first wireless connectivity.

5. The method as in claim 1 further comprising:
   receiving a message from the wireless access point, the message indicating a respective wireless communication protocol supported by the second wireless connectivity between the wireless access point and the mobile communication devices.

6. The method as in claim 1 further comprising:
   registering the second wireless station with a communication management resource, the first wireless connectivity established via a CBRS (Citizens Broadband Radio Service) wireless channel allocated by the communication management resource.

7. The method as in claim 1, wherein controlling the conveyance of communications over the second wireless connectivity based on the link quality includes:
   for a first duration of time, operating the second wireless station in a first mode in which the wireless access point controls allocation of wireless resources associated with the second wireless connectivity to the mobile communication devices; and
   for a second duration of time, operating the second wireless station in a second mode in which the second wireless station implements control of allocating wireless resources associated with the second wireless connectivity to the mobile communication devices in lieu of the wireless access point allocating wireless resources associated with the second wireless connectivity to the mobile communication devices.

8. The method as in claim 1, wherein controlling the conveyance of communications over the second wireless connectivity includes:
   communicating allocation control messages from the second wireless station through the wireless access point to the mobile communication devices.

9. The method as in claim 1 further comprising:
   notifying the wireless access point of an override mode in which the second wireless station controls allocation of wireless resources associated with the second wireless connectivity to the mobile communication devices.

10. The method as in claim 1, wherein controlling conveyance of communications over the second wireless connectivity based on the measured link quality includes:
    communicating allocation information to the mobile communication devices, the allocation information derived from the measured link quality, the allocation information reducing usage of bandwidth used by the mobile communication devices over the second wireless connectivity.

11. A system comprising:
    communication management hardware operative to:
    establish first wireless connectivity between a first wireless station and a second wireless station, the second wireless station in communication with a wireless access point that provides second wireless connectivity to multiple communication devices;
    measure a link quality provided by the first wireless connectivity; and
    control conveyance of communications over the second wireless connectivity based on the measured link quality provided by the first wireless connectivity.

12. The system as in claim 11, wherein the communication management hardware is further operative to:
    receive communication profile information from the wireless access point, the communication profile information indicating wireless data traffic requirements associated with the multiple communication devices; and
    adjust the conveyance of communications over the second wireless connectivity in response to detecting that the measured link quality of the first wireless connectivity is below a threshold value.

13. The system as in claim 11, wherein the communication management hardware is further operative to:
    communicate notifications to the mobile communication devices, the notifications adjusting allocation of wireless resources associated with the second wireless connectivity to the multiple communication devices depending on the measured link quality.

14. The system as in claim 11, wherein the communication management hardware is further operative to:
    modify an allocation of wireless bandwidth associated with the second wireless connectivity, the allocation of the wireless bandwidth being commensurate with wireless bandwidth available over the first wireless connectivity.

15. The system as in claim 11, wherein the communication management hardware is further operative to:
    receive a message from the wireless access point, the message indicating a respective wireless communication protocol supported by the second wireless connectivity between the wireless access point and the mobile communication devices.

16. The system as in claim 15, wherein the communication management hardware is further operative to:
    register the second wireless station with a bandwidth management resource, the first wireless connectivity established via a CBRS (Citizens Broadband Radio Service) wireless channel allocated by the bandwidth management resource.

17. The system as in claim 11, wherein the communication management hardware is further operative to:
for a first duration of time, operate the second wireless station in a first mode in which a remote allocation management resource controls allocation of wireless resources associated with the second wireless connectivity to the mobile communication devices; and
for a second duration of time, operate the second wireless station in a second mode in which a local allocation management resource in the second wireless station implements control of allocating wireless resources associated with the second wireless connectivity to the mobile communication devices in lieu of the wireless access point allocating wireless resources associated with the second wireless connectivity to the mobile communication devices.

18. The system as in claim 11, wherein the communication management hardware is further operative to:
communicate allocation control messages through the wireless access point to the mobile communication devices.

19. The system as in claim 11, wherein the communication management hardware is further operative to:
notify the wireless access point of an override mode in which the second wireless station controls allocation of wireless resources associated with the second wireless connectivity to the mobile communication devices.

20. The system as in claim 11, wherein the communication management hardware is further operative to:
communicate allocation information over the second wireless connectivity to the mobile communication devices, the allocation information derived from the measured link quality associated with the first wireless connectivity, the allocation information reducing usage of bandwidth used by the mobile communication devices over the second wireless connectivity.

21. A method comprising:
establishing first wireless connectivity between a first wireless station and a second wireless station, the second wireless station in communication with a wireless access point that provides second wireless connectivity to mobile communication devices;
receiving a performance metric, the performance metric indicating an ability to convey communications over the first wireless connectivity; and
communicating control messages to the mobile communication devices, the control messages indicating wireless resources of the second wireless connectivity allocated to the mobile communication devices, the wireless resources of the second wireless connectivity allocated depending on the performance metric.

22. The method as in claim 1, wherein performance metric indicates a bandwidth capacity of the first wireless connectivity.

23. The method as in claim 1, wherein communicating the control messages includes:
communicating a first control message to a first mobile communication device of the mobile communication devices, the first control message indicating first wireless bandwidth associated with the second wireless connectivity allocated to the first mobile communication device; and
communicating a second control message to a second mobile communication device of the mobile communication devices, the second control message indicating second wireless bandwidth associated with the second wireless connectivity allocated to the second mobile communication device.

24. The method as in claim 23, wherein the control messages reduce an amount of bandwidth in the second wireless connectivity allocated to the mobile communication devices.

25. The method as in claim 21 further comprising:
communicating the control messages over the second wireless connectivity to the mobile communication devices.

26. Computer-readable storage hardware having instructions stored thereon, the instructions, when carried out by computer processor hardware, cause the computer processor hardware to:
establish first wireless connectivity between a first wireless station and a second wireless station, the second wireless station in communication with a wireless access point that provides second wireless connectivity to multiple communication devices;
measure a link quality provided by the first wireless connectivity; and
control conveyance of communications over the second wireless connectivity based on the measured link quality provided by the first wireless connectivity.

\* \* \* \* \*